June 10, 1930.　　　L. V. ANDREWS　　　1,763,496
PULVERIZING APPARATUS
Filed July 5, 1929　　　2 Sheets-Sheet 2
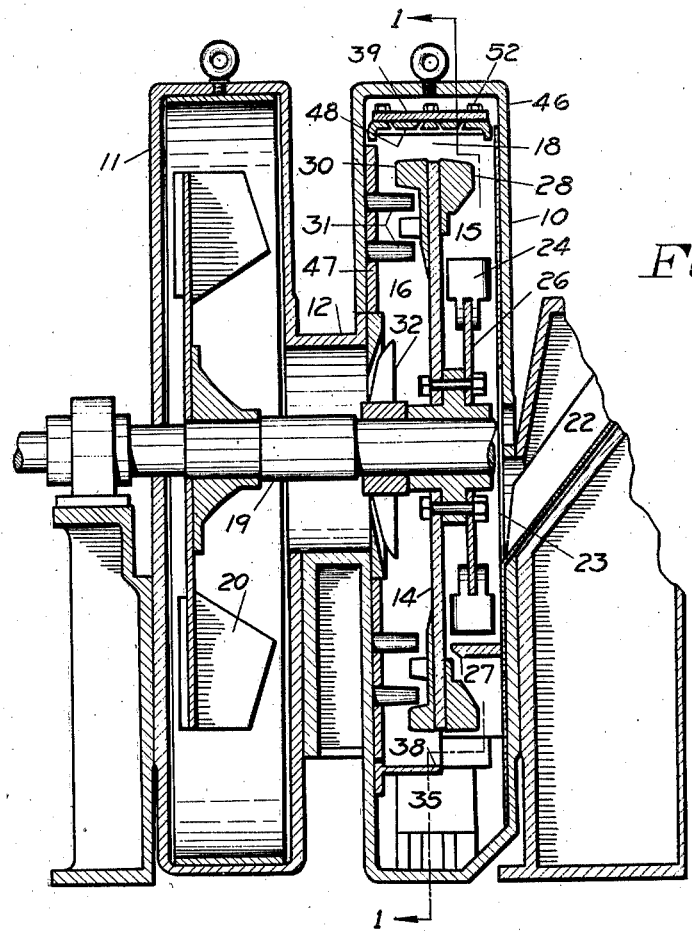
Fig. 5
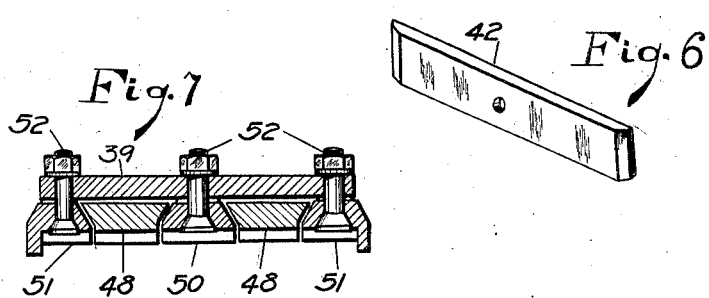
Fig. 7
Fig. 6
WITNESSES
C. W. Morrissey
A. G. Blodgett
INVENTOR
L. V. ANDREWS
BY Clayton R. Jenks
ATTORNEY

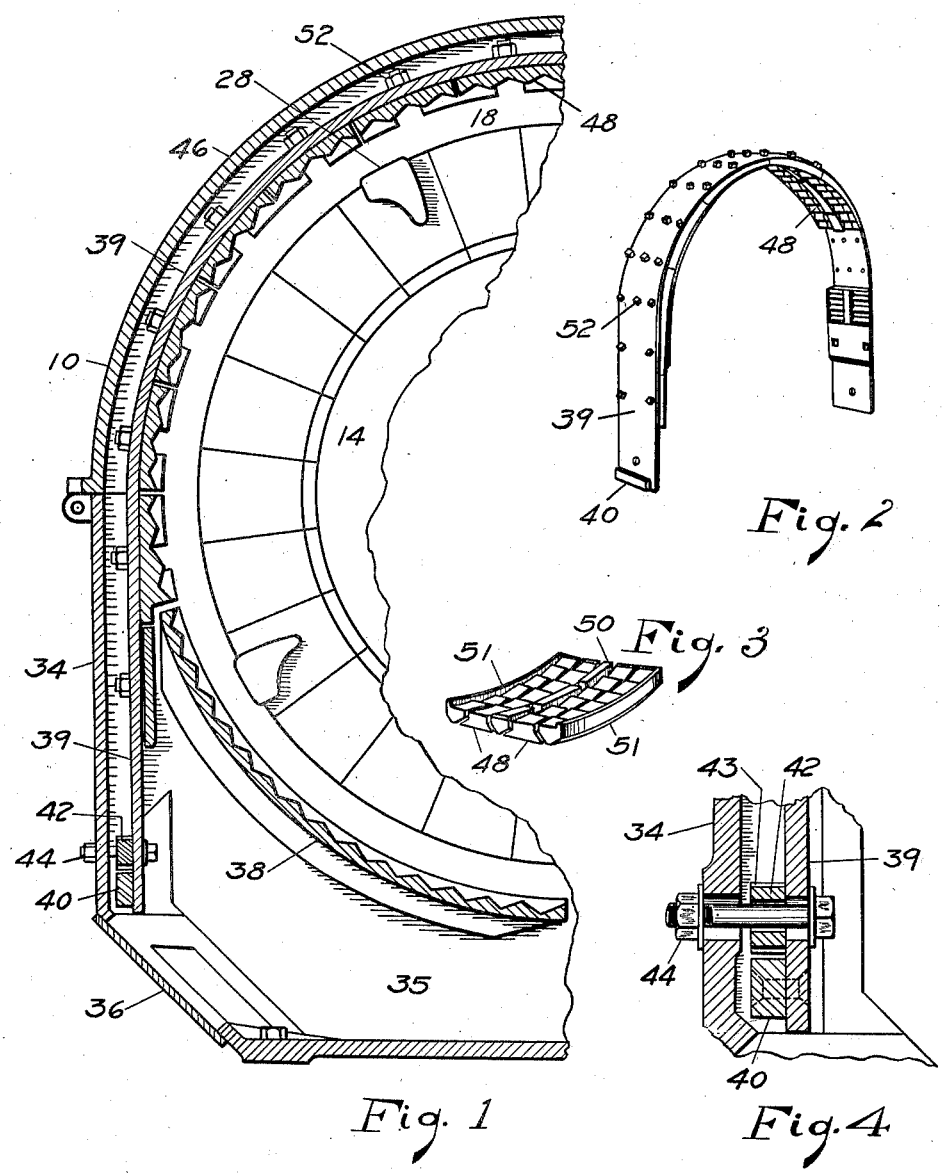

Patented June 10, 1930

1,763,496

UNITED STATES PATENT OFFICE

L. V. ANDREWS, OF WORCESTER, MASSACHUSETTS, ASSIGNOR TO RILEY STOKER CORPORATION, OF WORCESTER, MASSACHUSETTS, A CORPORATION OF MASSACHUSETTS

PULVERIZING APPARATUS

Application filed July 5, 1929. Serial No. 376,040.

This invention relates to pulverizing apparatus, and more particularly to machines of the high speed rotary beater type.

Certain difficulties have arisen in the past in the operation of apparatus of this type. Hard foreign bodies, such as pieces of tramp metal, are frequently present in the material to be pulverized, and if such bodies enter the pulverizing machine they are liable to be thrown with an enormous velocity against the casing wall. Moreover there is a danger of the pulverizing elements themselves being broken by contact with tramp metal, or because of weakness due to wear or a hidden defect, and the broken parts may cause serious damage to other parts of the machines. Under certain circumstances the entire casing of the pulverizer may be wrecked, with grave danger to the operator.

It is accordingly the main object of this invention to overcome these difficulties and to provide a construction for a high speed pulverizer which will be free from the danger of serious injury to the operator of the machine or damage to the casing, arising from tramp metal or broken parts of the machine itself being hurled outwardly under the centrifugal force set up by the rapidly revolving parts.

Another object is to provide a simple and readily assembled construction which permits the easy renewal of parts subject to wear.

A further object is to provide a construction affording ample space for the accumulation of hard foreign bodies which permits ready access thereto and yet protects the rapidly revolving pulverizing elements from further contact with such foreign bodies.

A still further object is to provide a pulverizer with a space for the accumulation of hard bodies which is separated from the rapidly revolving elements by a frangible closure which may break if occasion requires to permit a hard body to pass into the space therebeneath.

With these and other objects in view, as will be apparent to those skilled in the art, my invention resides in the combination of parts set forth in the specification and covered by the claims appended hereto.

My invention is particularly applicable to pulverizers of the type shown in the patent to Craig No. 1,714,080 having two sets of pulverizing elements rotatable about a substantially horizontal axis, and located on opposite sides of a rotor disk; and in accordance therewith I provide in the lower part of the casing beneath the pulverizing elements a large space in which material may accumulate. This accumulation forms a comparatively soft mass in which tramp metal or broken parts of the machine may become embedded. As a further means of preventing injury to the machine by such hard bodies, I provide a protective liner in the upper portion of the casing which is capable of withstanding the impacts of hard bodies hurled outwardly by the revolving pulverizing elements and of preventing damage to the casing wall, and which is preferably so arranged that such hard bodies will be directed by the liner into the space beneath the pulverizing elements. The liner is preferably spaced from the upper portion of the casing and supported entirely independently thereof; and it is made of resilient material capable of withstanding a severe impact, whereby shocks or impacts on the liner will be absorbed thereby, and not be transmitted to the upper portion of the casing. To this end the liner may be formed as an inverted U-shaped strap of steel plate fastened solely at its ends to the bottom of the casing and spaced from the upper portion of the casing wall. Since this liner is in the path of the pulverized material thrown outwardly by the pulverizing elements, it is preferred that it be covered with wear plates which may be readily replaced as occasion requires. In accordance with this construction, the casing may be formed of two parts split along a horizontal axial plane, whereby the upper half of the casing may be removed from the lower half without interfering with the liner.

A shelf is preferably placed beneath the revoluble pulverizing elements at the entrance side of the casing whereby material will be held in contact therewith, and an opening is provided above these elements so that foreign bodies may travel through the annular space outside the path of the pulverizing elements into the space beneath the shelf, where they may accumulate. A further shelf is provided beneath the pulverizing elements at the exit side of the machine so that the foreign bodies may not rebound into contact with these rapidly rotating parts. This shelf may, however, be made of comparatively weak and frangible material so that if one of the pulverizing elements at the exit side of the machine should fly from the rotor it may break through the shelf and become embedded in the material at the bottom of the casing and so prevent further damage to the machine.

Referring to the drawings illustrating a preferred embodiment of my invention, and in which like reference numerals indicate like parts:

Fig. 1 is a transverse vertical section through the machine shown in Fig. 5, the section being taken on the line 1—1 of Fig. 5, and certain parts being broken away;

Fig. 2 is a perspective view of the liner of the pulverizing chamber, certain of the liner blocks being removed;

Fig. 3 is a perspective view showing a number of the liner blocks arranged adjacent each other in the manner in which they are located at assembly;

Fig. 4 is a detail in section showing the method of holding the liner strap in position;

Fig. 5 is a longitudinal vertical section through the machine;

Fig. 6 is a perspective view of a locking key; and

Fig. 7 is a detail in section showing the method of mounting the liner blocks on the strap.

The embodiment illustrated in the drawings comprises a casing arranged to form a pulverizing chamber 10 and a fan chamber vided within the pulverizing chamber to form ing a centrally located outlet from the pulverizing chamber. A rotor disk 14 is provided within the pulverizing chamber to form two pulverizing zones 15 and 16 on opposite sides thereof which are connected by an annular passage 18 around the disk. This disk is mounted on a horizontal rotatable shaft 19 which extends through the machine and supports a fan 20 of suitable type in the fan chamber 11.

Suitable pulverizing elements are provided in the pulverizing chamber 10 to reduce the coarse material to the desired degree of fineness. These pulverizing elements may be shaped and arranged in various ways within the scope of my invention, the preferred construction being shown and described in said patent to Craig No. 1,714,080, to which reference may be had for a complete disclosure.

The coarse material is supplied to a chute 22 by a suitable feeding mechanism and enters the first zone 15 of the machine through an inlet opening 23 provided in the casing wall near the shaft 19. A number of beaters or hammers 24 are arranged to revolve in the zone 15 to crush the material preliminarily, and these hammers may be mounted on a disk 26 which is mounted on and driven by the shaft 19. A stationary arcuate plate 27 is arranged beneath the hammers and extends throughout substantially 180 degrees just outside their peripheral path, in order to make sure that all the coarse material which enters the machine will be acted upon by the hammers. This plate does not extend above the hammers 27, and hence a large opening is left through which material may pass after being struck by the hammers. A few widely spaced agitator pegs 28 are mounted on the disk 14 and revolve outside the plate 27 to assist in transporting the material through the machine. In the second zone 16 I provide revoluble pegs 30 on the rotor which cooperate with stationary pegs 31 on the casing to pulverize the material finely. Revoluble rejector blades 32 near the outlet 12 serve to scoop from the outwardly flowing air current any course particles of material which may reach them, and these particles are thrown back by the rejectors into the zone 16 for further pulverization. These rejector blades are more fully described in the patent to Blyth No. 1,649,148.

Since there is always a danger of tramp metal entering the machine with the coarse material and causing injury to the pulverizing elements, I preferably form the lower part of the casing with substantially straight vertical sides 34 as shown in Fig. 1, thereby providing a large space 35 beneath the rotor for the accumulation of a bed of the material being pulverized. Tramp metal thrown upwardly and outwardly by the hammers 24 will fall to the bottom of the machine and become embedded in this accumulation. Access may be had to the space 35 through a door 36 in the casing. In order to prevent such tramp metal from reaching the comparatively fragile pegs in the second pulverizing zone 16, I provide a shelf 38 which is mounted on the casing wall and extends horizontally beneath these pegs. This shelf, which is preferably provided with a grooved or corrugated upper surface, is spaced from the rotor disk to leave room for the material to pass, and it is formed in the arc of a circle having its center on the axis of the shaft. The shelf and the liner form a complete circle around the rotor. I prefer to make this shelf 38 comparatively thin and of a hard brittle material such as white cast iron, so that in case one of the pulverizing elements in the second zone should fail it would break through the shelf and become embedded in the material therebeneath without causing further damage to the machine.

One important feature of the invention involves the provision of means for suitably protecting the casing of the pulverizing chamber from wear and damage either from the material being pulverized or from tramp metal which may enter the machine. For this purpose I provide a strap or band 39 of strong resilient material such as steel, which is preferably shaped as an inverted U extending over the rotor and spaced slightly from the casing. This strap is nearly the full width of the chamber and is supported by its lower ends at the bottom of the chamber. In order to hold the strap firmly in position I provide a shoulder at each lower end thereof by any suitable means such as a block 40 welded or riveted to the strap. A rectangular key 42 (Fig. 6) extends above each block 40 and through openings 43 in the opposite walls of the casing to lock the strap in place. Accidental endwise withdrawal of the key is prevented by a bolt 44 which passes through the strap, the key, and the casing.

The casing of the pulverizing chamber is split substantially along a horizontal axial plane, as indicated in Fig. 1, and access to the interior of the chamber may be had by lifting the upper portion 46 from the base of the casing. Before lifting this part 46 it must first be disconnected from the lower portion of the casing and also from the plate 47 which supports the stationary pegs 31.

The strap 39 is of sufficient strength to prevent damage to the casing from tramp metal and to absorb all shocks caused by the impact of hard foreign bodies. Since the strap is spaced from the casing and supported entirely out of contact with the upper part 46 thereof, no such shocks can be transmitted to the casing. The strap however is ordinarily made of soft steel, which is not well adapted to withstand the abrasions and wear caused by the material being pulverized. For this reason I prefer to protect the inner surface of the strap by means of a number of small wear plates or blocks 48 having corrugated faces and located in two rows opposite the revolving pegs 28 and 30, where the maximum wear occurs.

The blocks 48 are preferably made of some very hard material, such as white cast iron, so as to withstand for a long time the abrasion caused by the material hurled against them by the revolving pegs. White iron, however, is brittle and there is a slight danger of these blocks being cracked or broken by a piece of tramp metal. I therefore preferably so mount the parts that in the event of such an occurrence the broken parts will still be held in place and prevented from falling into contact with the rapidly revolving pegs. For this purpose I form the blocks 48 in a dove-tail shape and hold them in place by means of overlying wedge shaped blocks 50 between them and blocks 51 at each side.

The blocks 50 and 51, which are fastened to the strap 39 by means of bolts 52, are not subjected to excessive abrasion and are preferably made of some tough strong material such as malleable iron which will withstand shocks without cracking. They serve to lock the hard wear plates 48 in position even in the event these plates should break.

The liner strap 39 and the blocks mounted thereon are preferably made symmetrical as illustrated. This construction is particularly desirable in a machine of the two zone type shown, since it is found in practice that the row of blocks 48 opposite the pegs 30 wear much more rapidly than the other row. It is therefore possible to obtain the same service from each row by merely reversing the position of the strap 39 in the machine at the proper time. An extra strap, with blocks mounted thereon, may be kept in stock and inserted in the machine when the blocks in use require replacement. In this way the time required for replacement can be reduced to a very few minutes, and the machine can be very quickly put back into service after a shut down.

The operation of the invention will now be apparent from the above disclosure. Coarse material is delivered to the chute 22 at a regulatable rate by means of any suitable feeding device, and is broken up preliminarily by the hammers 24. Any pieces of tramp metal or other hard foreign bodies entering with the material are thrown outwardly by the hammers and become embedded in the mass of material which accumulates in the space 35 at the bottom of the casing. The fan 20 produces an air current through the machine which carries the material around the outside of the rotor and into the second zone 16, where it is finely pulverized by the pegs 30 and 31. The fine material leaves the pulverizing chamber through the passage 12 and enters the fan chamber 11, from whence it is transported by the air current through an outlet passage (not shown) to a point of use or storage. The shelf 38 prevents tramp metal from reaching the pulverizing elements in the second zone, yet will fracture and permit any of these elements which might break loose from its fastening, because of a hidden defect or flaw, to reach the bottom of the chamber. The resilient strap 39 absorbs all shocks caused by the impact of foreign bodies and prevents damage to the casing. The blocks 48 receive the wear due to the abrasion of the material, and can be easily renewed when this becomes necessary after a long period of service.

Having thus described my invention, what I claim as new and desire to secure by Letters Patent is:

1. A pulverizing apparatus comprising a casing having an inlet for coarse material and an outlet for pulverized material, rotatable pulverizing elements mounted within the casing, a protecting resilient liner for the upper portion of the casing which is spaced therefrom, and means for supporting the liner solely on the lower portion of the casing and independently of the upper portion thereof.

2. A pulverizing apparatus comprising a casing having an inlet for coarse material and an outlet for pulverized material, pulverizing elements mounted within the casing and arranged to revolve about a substantially horizontal axis, an inverted U-shaped protecting liner mounted within and spaced from the upper portion of the casing outside of the path of the pulverizing elements to protect the casing against damage from hard foreign bodies, and means for fastening the liner in position.

3. A pulverizing apparatus comprising a casing having an inlet for coarse material and an outlet pulverized material, said casing being divided into an upper and a lower portion which are separable to permit access to its interior, pulverizing elements mounted within the casing and arranged to revolve about a substantially horizontal axis, an inverted U-shaped protecting liner mounted within the casing above the pulverizing elements and spaced from the upper portion of the casing, and means for supporting the liner solely at its lower ends on the lower portion of the casing.

4. A pulverizing apparatus comprising a casing having an inlet for coarse material and an outlet for pulverized material, rotatable pulverizing elements mounted within the casing, a resilient protecting liner plate mounted within and spaced from the casing and outside the peripheral path of the pulverizing elements, said liner plate being capable of withstanding the impacts of hard bodies hurled thereagainst by the pulverizing elements, and a series of hard wear resisting blocks mounted on the liner plate to receive the abrasion of the material being pulverized.

5. A pulverizing apparatus comprising a casing having an inlet for coarse material and an outlet for pulverized material, rotatable pulverizing elements mounted within the casing, a resilient liner plate mounted within the casing, a series of hard wear resisting blocks mounted on the liner plate to receive the abrasion of the material being pulverized, and a series of blocks formed of tough shock resisting material which overlie portions of the wear resisting blocks and thereby serve to hold them in place despite fractures which may occur in them.

6. A pulverizing apparatus comprising a casing having an inlet for coarse material and an outlet for pulverized material, rotatable pulverizing elements mounted within the casing, a resilient protective liner plate mounted within the casing and above the pulverizing elements, and a series of hard wear resisting blocks mounted on the liner plate to receive the abrasion of the material being pulverized, said liner plate and blocks being symmetrically constructed so that the plate may be reversed in position in the casing to equalize the wear on the blocks.

7. Pulverizing apparatus comprising a casing having on opposite sides thereof an inlet for coarse material and an outlet for pulverized material, a rotor disk mounted within the casing and arranged to form two pulverizing zones on opposite sides thereof which are adjacent to the inlet and outlet respectively, means in the inlet zone to crush the material preliminarily, means in the outlet zone to pulverize the material finely, a resilient liner plate mounted within and spaced from the casing and located near the periphery of the rotor disk, and a series of hard wear resisting blocks mounted on the liner plate to receive the abrasion of the material being pulverized.

8. A pulverizing apparatus comprising a casing having on opposite sides thereof an inlet for coarse material and an outlet for pulverized material, a rotor disk mounted within the casing and arranged to form two pulverizing zones on opposite sides thereof which are adjacent to the inlet and outlet respectively, means in the inlet zone to crush the material preliminarily, means in the outlet zone to pulverize the material finely, a resilient liner plate mounted within the casing and spaced therefrom, a row of hard wear resisting blocks mounted on the liner plate opposite each zone to receive the abrasion of the material, and a plurality of blocks formed of tough shock resisting material which overlie portions of the wear resisting blocks and thereby serve to hold them in place despite fractures which may occur in them.

9. A pulverizing apparatus comprising a casing having on opposite sides thereof an inlet for coarse material and an outlet for pulverized material, a rotor disk mounted within the casing and arranged to form two pulverizing zones on opposite sides thereof which are adjacent to the inlet and outlet respectively, means in the inlet zone to crush the material preliminarily, and means in the outlet zone to pulverize the material finely, the sides of the lower portion of the casing being substantially vertical so as to provide a large space for the accumulation of material beneath both of said pulverizing zones, in which material any tramp metal entering the machine may become embedded.

10. A pulverizing apparatus comprising a casing having on opposite sides thereof an inlet for coarse material and an outlet for pulverized material, a rotor disk mounted within the casing and arranged to form two pulverizing zones on opposite sides thereof which are adjacent to the inlet and outlet respectively, means in the inlet zone to crush the material preliminarily, means in the outlet zone to pulverize the material finely, the sides of the lower portion of the casing being substantially vertical so as to provide a large space for the accumulation of material beneath both of said pulverizing zones, and means providing a shelf which extends above this space and beneath the outlet pulverizing zone to prevent tramp metal from entering this zone.

11. A pulverizing apparatus comprising a casing having on opposite sides thereof an inlet for coarse material and an outlet for pulverized material, a rotor disk mounted within the casing and arranged to form two pulverizing zones on opposite sides thereof which are adjacent to the inlet and outlet respectively, means in the inlet zone to crush the material preliminarily, means in the outlet zone to pulverize the material finely, the lower portion of the casing having substantially vertical sides so as to provide a large space for the accumulation of material beneath both of said pulverizing zones, and means providing a shelf which extends above this space and beneath the outlet zone, said shelf being comparatively thin and of fragile material so as to yield in the event of failure of the pulverizing means in the outlet zone.

12. A pulverizing apparatus comprising a casing having on opposite sides thereof an inlet for coarse material and an outlet for pulverized material, a rotor disk mounted within the casing and arranged to form two pulverizing zones on opposite sides thereof which are adjacent to the inlet and outlet respectively, means in the inlet zone to crush the material preliminarily, means in the outlet zone to pulverize the material finely, the lower portion of the casing having substantially vertical sides so as to provide a large space for the accumulation of material beneath both of said pulverizing zones, in which material any tramp metal entering the machine may become embedded, and an inverted U-shaped liner plate mounted within the casing above the rotor, said liner plate being spaced from the upper portion of the casing and supported entirely by its lower ends in the lower portion of the casing.

13. A pulverizing apparatus comprising a casing having revoluble pulverizing elements therein, means providing a space for hard bodies outside of the path of said elements and a frangible member between said elements and space adapted to break and permit a hard body to pass from the pulverizing zone to said space.

Signed at Worcester, Massachusetts, this 29th day of June, 1929.

L. V. ANDREWS.

CERTIFICATE OF CORRECTION.

Patent No. 1,763,496.  Granted June 10, 1930, to

L. V. ANDREWS.

It is hereby certified that error appears in the printed specification of the above numbered patent requiring correction as follows: Page 2, line 43, strike out the syllable and words "vided within the pulverizing chamber to" and insert the numeral and words "11 which are connected by a passage 12"; page 4, line 22, claim 3, after the word "outlet" insert the word "for"; and that the said Letters Patent should be read with these corrections therein that the same may conform to the record of the case in the Patent Office.

Signed and sealed this 9th day of September, A. D. 1930.

M. J. Moore,
Acting Commissioner of Patents.

(Seal)